(12) United States Patent
Mishra et al.

(10) Patent No.: US 6,473,070 B2
(45) Date of Patent: Oct. 29, 2002

(54) WIRELESS TRACKING SYSTEM

(75) Inventors: Animesh Mishra, Milpitas, CA (US); Jun Shi, San Jose, CA (US); Karl H. Mauritz, Chandler, AZ (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 9 days.

(21) Appl. No.: 09/222,087

(22) Filed: Dec. 29, 1998

(65) Prior Publication Data

US 2001/0015717 A1 Aug. 23, 2001

Related U.S. Application Data

(63) Continuation-in-part of application No. 09/185,722, filed on Nov. 3, 1998.

(51) Int. Cl.[7] .................................................. G09G 5/08
(52) U.S. Cl. ...................... 345/158; 345/156; 345/157; 345/159; 345/160; 345/428
(58) Field of Search ................................. 345/156, 157, 345/158, 159, 160, 428

(56) References Cited

U.S. PATENT DOCUMENTS

| | | | | |
|---|---|---|---|---|
| 5,731,757 A | * | 3/1998 | Layson et al. | 340/573 |
| 5,945,981 A | * | 8/1999 | Paull et al. | 345/180 |
| 5,991,693 A | * | 11/1999 | Zalewski | 701/300 |
| 5,999,167 A | * | 12/1999 | Marsh et al. | 345/158 |
| 6,008,777 A | * | 12/1999 | Yiu | 345/2 |
| 6,028,593 A | * | 2/2000 | Rosenberg et al. | 345/156 |
| 6,229,526 B1 | * | 3/2001 | Berstis | 345/158 |

OTHER PUBLICATIONS

The New Standard for Infrared Bi–Directional Command and Control Devices, 1–3, printed from web site http://www.irbus.org, dated at least as early as Dec. 14, 1998.

IR Remote System, 1–5, printed from web site http://web2.airmail.net, dated at least as early as Dec. 14, 1998.

* cited by examiner

Primary Examiner—Richard Hjerpe
Assistant Examiner—Jean Lesperance
(74) Attorney, Agent, or Firm—Trop, Pruner & Hu, P.C.

(57) ABSTRACT

A tracking system for tracking one or more wireless input devices includes a receiver to receive wireless signals from the input devices and a tracking circuit to detect movements of the wireless input devices. The input devices may be either infrared (IR) or radio-frequency (RF) input devices.

36 Claims, 9 Drawing Sheets

WIRELESS TRACKING SYSTEM

The present application is a continuation-in-part of copending and commonly assigned U.S. patent application Ser. No. 09/185,722, entitled "Wireless Pointing System," filed Nov. 3, 1998.

BACKGROUND

The invention relates generally to wireless tracking of one or more input devices.

Wireless input devices are used to control a variety of different systems including computer systems and consumer electronic devices such as televisions or radios. A wireless control device used with a consumer electronic device such as a television or radio typically includes a remote control unit that transmits an infrared signal or radio frequency signal that is detected and decoded by a receiver. The decoded signal is then used to control the electronic device.

In some systems that run applications such as game applications, a number of different users may provide inputs to the same software program. For example, with a game application program, a number of users may communicate input commands to the game through wired connections. Each of the users, for example, may have a joystick or other input device that controls the position or action of an image on a display device.

Conventionally, such input devices are electrically coupled to a system using wired connections. Generally, wireless inputs are not used when a plurality of users are providing different inputs to the same application program running in the system. One reason for this is that it would be difficult to distinguish between the various inputs. Thus, multi-user applications have conventionally employed wired connections from input devices to the system in which the application program is running.

Thus, there is a need for ways to enable a plurality of wireless input devices to communicate and control an electronic device or application.

SUMMARY

In accordance with one embodiment of the invention, a system for tracking one or more wireless input devices includes a receiver to receive wireless signals from the one or more wireless input devices and a tracking circuit to detect movements of the one or more wireless input devices.

DETAILED DESCRIPTION

In the following description, numerous details are set forth to provide an understanding of the present invention. However, it is to be understood by those skilled in the art that the present invention may be practiced without these details and that numerous variations or modifications from the described embodiments may be possible.

Figure 1:
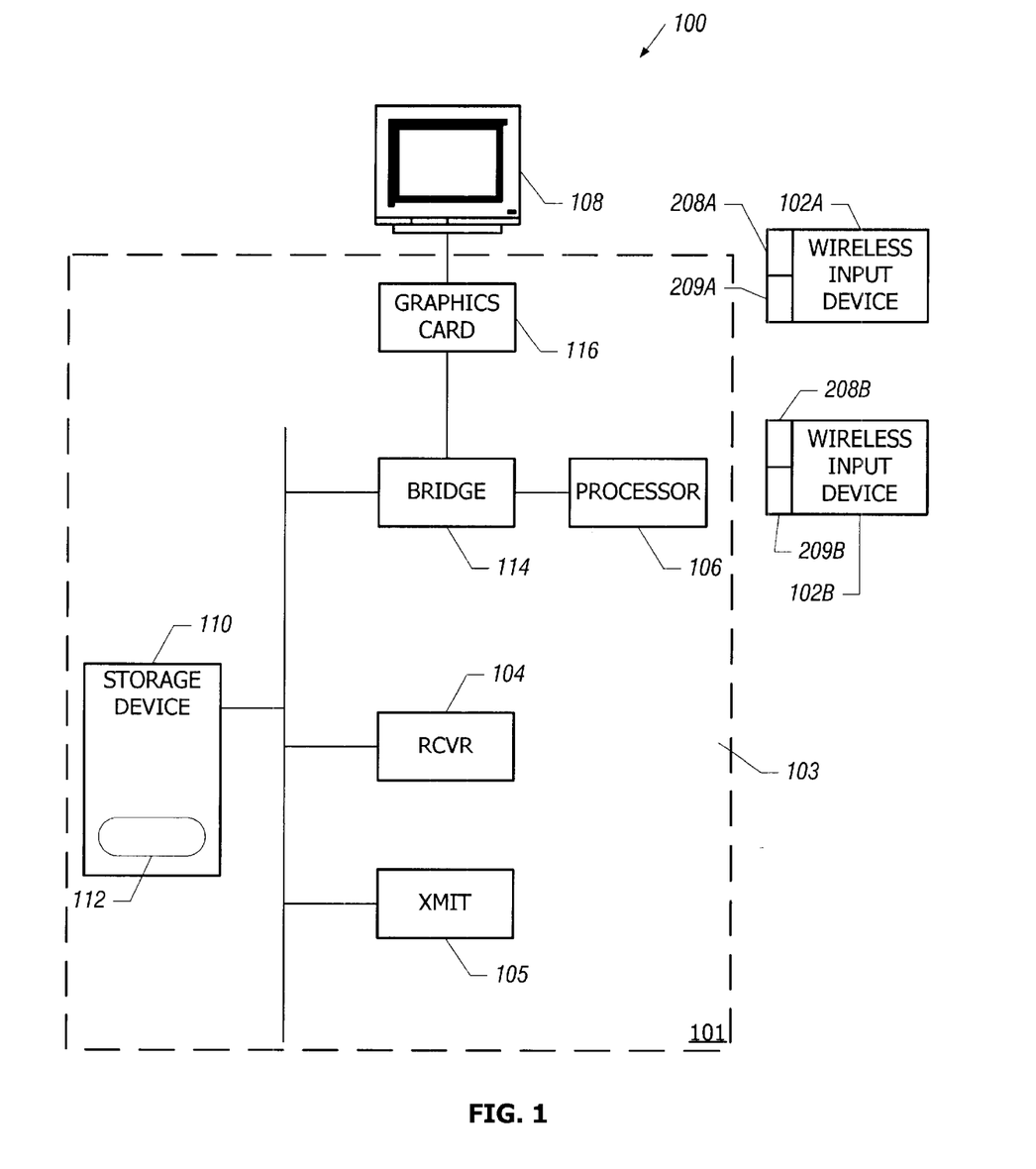
FIG. 1 shows an embodiment of a system having one or more wireless input devices.

Referring to FIG. 1, an illustrative system 100 includes one or more wireless input devices (102A and 102B in the illustrated embodiment); a receiver (RCVR) 104 to receive signals from the wireless input devices 102A, 102B; a transmitter (XMIT) 105 to transmit signals to the wireless input devices 102A, 102B; a processor 106; and a display 108. Larger numbers of wireless input devices are also possible in further embodiments. In one example, the receiver 104, the transmitter 105, and processor 106 may be part of an integrated sub-system 101, such as a set-top box (STB), a computer, an appliance (e.g., video cassette recorder), an electronic game device, a consumer electronic device, or any other devices capable of being controlled by one or more wireless input devices. In further embodiments, the sub-system 101 may be controlled by a combination of wireless and wired input devices.

The receiver 104 may include a plurality of detectors or sensors, such as infrared (IR) sensors, radio frequency (RF) sensors, or other sensors to detect other types of wireless signals. The sensors are adapted to receive transmitted signals from wireless input devices 102A, 102B from which motion of the wireless input devices 102A, 102B may be detected. Each wireless input device 102A or 102B may communicate with the receiver 104 over a wireless link 103, such as an IR link, RF link, or other link. One IR link may be according to the IrBus Specification, IrDA CIR (Control IR) Standard, Revision 1.0 d, dated February 1998.

The transmitter 105 in the sub-system 101 can transmit queries or messages to the wireless input devices 102A, 102B also over the wireless link 103. In one embodiment, such queries or messages transmitted by the transmitter 105 may be used to periodically poll the wireless input devices 102A, 102B to determine their positions and whether they have moved.

In one embodiment of the sub-system 101, the processor 106 may be coupled to a system bus 107 through a bridge controller 114. A graphics port may be integrated into the bridge controller 114, which is coupled to a graphics card 116 to control display of images on the display 108. A storage device 110 may also be coupled to the system bus 107 to store data and instructions that are executable by the processor 106. In one embodiment, a wireless input device control program 112 may be stored in the storage device 110 for execution by the processor 106.

Illustrative processors may include the PENTIUM® family of processors and the 80×86 families of processors from Intel Corporation or other processors. Processors may also include microcontrollers, application-specific integrated circuits (ASICs), programmable gate arrays (PGAs), and the like. Illustrative displays may include a cathode ray tube (CRT) unit, a liquid crystal display (LCD) unit, or a television. In further embodiments, the sub-system 101 may also include multiple processors to provide a multiprocessing system.

In one embodiment, bi-directional communications can occur over the wireless link 103 between the input devices 102A, 102B and the sub-system 101. In the illustrated embodiment, each of the plurality of wireless input devices 102A, 102B includes a receiver 209A or 209B to receive queries or messages from the transmitter 105 in the sub-system 101. Each wireless input device also includes a transmitter 208A or 208B to transmit signals to the receiver 104 in the sub-system 101. Communications between the wireless input devices 102A, 102B and the sub-system 101 allow a plurality of different users to provide wireless inputs to control the sub-system 101. For example, in game applications, a number of different users may provide separate and distinct inputs to the sub-system 101 that may be recognized by the system and used to control a game or other application. The sub-system 101 may alternatively be a computer that has wireless connections to a pointer device (e.g., mouse) and one or more other input devices (e.g., joystick, keyboard, etc.). In other applications, the sub-system 101 may include a box capable of receiving cable TV signals, satellite TV signals, or terrestrial signals. The sub-system 101 may also be used to control appliances in a home environment or office equipment in a work environment.

In the electronic game example, the sub-system 101 may present images such as game pieces that are controllable by different users (e.g., one game piece per user) on the display 108 through a graphical user interface. Inputs from the various users through the wireless input devices may adjust the positions of their individual game pieces. To provide a three-dimensional (3D) game display, the sub-system 101 may be capable of detecting movement of the input devices 102A, 102B in three dimensions, as further discussed below.

The system 100 may keep track of the inputs from the various users by recording the positions of the wireless input devices. In one embodiment, under control of the processor 106, the transmitter 105 in the sub-system 101 may transmit queries to the wireless input devices 102A, 102B to determine their positions. This may be performed, for example, by transmitting queries in a time-multiplexed manner, in which a first input device (e.g., 102A) is queried in one time slice, a second input device (e.g., 102B) is queried in a second time slice, and so forth if more input devices are present. In effect, the input devices 102A, 102B are interrogated by the sub-system 101 in a round-robin fashion.

Each query transmitted by the transmitter 105 in the sub-system 101 may prompt the queried wireless input device 102 to respond. Signals transmitted by the queried wireless input device 102 are received by the receiver 104 so that movement of the input device 102 may be detected. After transmitting its response, the transmitter 208 in the input device 102 does not transmit. In this manner, conflicts between multiple wireless input devices may be avoided.

Each wireless input device 102 is associated with a unique identifier (ID). A query from the transmitter 105 includes a specific ID so that only one of the input devices 102 responds to the query. Thus, in each time slice, the transmitter 105 issues a query having a corresponding ID. The wireless input device 102 having that ID responds to the query by transmitting predetermined signals as further discussed below. Based on the transmitted signals of the responding input device 102, the receiver 104 in the sub-system 101 can determine the input device's movement. This is repeated in the next time slice with another ID to detect movement of another wireless input device. There may be as many time slices as there are input devices. A defined total time period (e.g., about 30 milliseconds or other suitable time period) may include several time slices corresponding to the number of input devices 102. Detection of movement of each input device 102 may thus be performed every such defined total time period.

Figure 9:
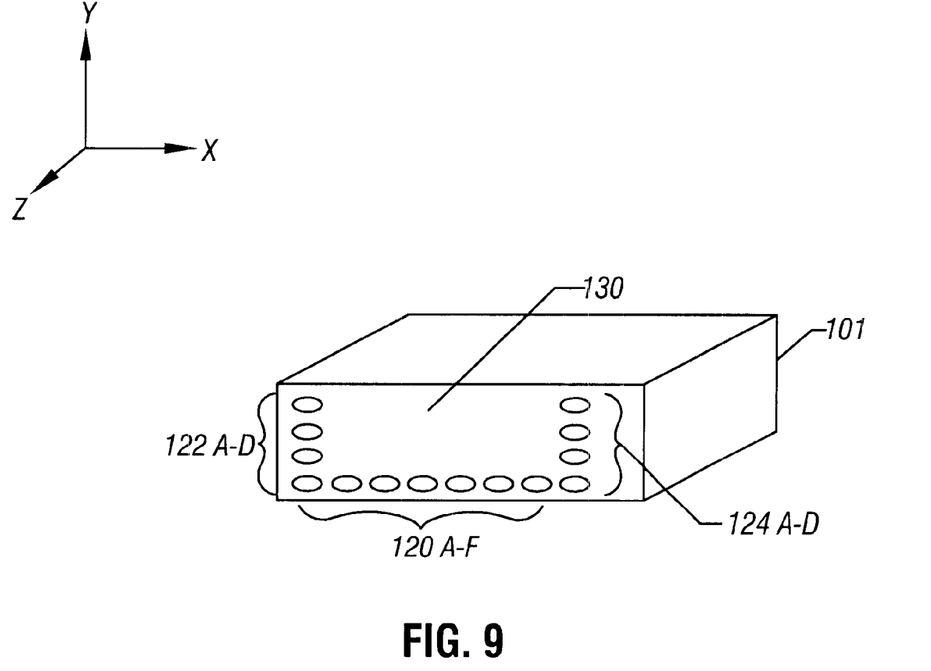
FIG. 9 illustrates positions of sensors in the system of FIG. 1 in accordance with an embodiment.

Referring to FIG. 9, in one embodiment, the sub-system 101 may be a set-top box or other device in which are arranged a matrix of sensors 120, 122, and 124. In the ensuing described embodiment, the sub-system 101 includes a set-top box; however, it is to be understood that the invention is not to be so limited as other types of sub-systems 101 may be included in further embodiments. The sensors 120, 122, and 124 may be arranged on the inner wall 130 of the front side of the set-top box housing, although it will be appreciated that the sensors may be arranged differently, such as being attached to the side walls, top or bottom walls, or back wall of the set-top box. In another embodiment, some or all of the sensors may be mounted externally to the set-top box 101. The sensors 120, 122, and 124 may be arranged in some predefined matrix, such as that illustrated in FIG. 9. As shown, a row of sensors 120A–F are mounted generally horizontally to detect horizontal motion of the wireless input devices 102A, 102B. Two columns 122A–D and 124A–D of sensors arranged generally vertically may be used to detect vertical movement of the input devices 102A, 102B. In further embodiments, a smaller or larger number of sensors may be used. For example, only one column of sensors may be implemented to detect vertical motion, and that column may be arranged more towards the center of the front wall 130 of the set-top box 101. The number of sensors in each row or column may be two or more. The number of sensors utilized depends on the granularity desired in detecting motion of the input devices. Generally, a larger number of sensors provides greater granularity; that is, movement of input devices may be pin-pointed with greater accuracy.

The row and columns of sensors 120, 122, and 124 illustrated in FIG. 9 allow detection of motion along two directions or dimensions (X and Y). To detect motion in a third dimension (Z) according to one embodiment, several techniques may be used. In one embodiment, the received energy level of the transmission of a wireless input device may be determined. For example, the amplitude of a signal from the wireless input device is greater when it is closer to the set-top box 101 and lower when the wireless input device is further away. The processor 106 may compare the received energy levels with information in a calibration table stored in the storage device 110 to determine the distance between an input device and the set-top box 101.

Alternatively, sensors or detectors in the receiver 104 may be arranged in all three dimensions (X, Y, and Z). One embodiment includes sensors arranged spherically so that movement of the input devices 102 may be tracked in all three dimensions. In further embodiments, other three-dimensional arrangements of sensors may also be possible. In another embodiment, as further described in connection with FIG. 8 below, movement in the Z dimension may be represented by rotation of each input device by modifying the design of each input device 102 and the receiver 106.

Calibration of the input devices 102A, 102B may be performed once by the manufacturer when expected energy levels based on possible positions are generated and stored in the set-top box 101. For example, the input devices 102A, 102B may be positioned at different known distances and angles with respect to the set-top box 101. Amplitudes of the received signals are measured and stored in a calibration table for later use.

Using techniques according to some embodiments, graphical representations (in the form of images) in a three-dimensional (3D) virtual space may be created for the user, such as in a game application. Movements of wireless input devices 102 are translated by the processor 106 into corresponding movements of images presented by a game application program, for example. By polling the input devices 102 in a round-robin fashion to determine their movement allows the processor 106 to determine movement of each input device without the input devices interfering with each other.

In a further embodiment, polling of some devices (which are faster moving, for example) may be performed more frequently than other devices. In such embodiments, the round robin polling scheme may interrogate the faster moving devices more than once during the defined total time period, while the other devices may be polled only once.

Figure 10:
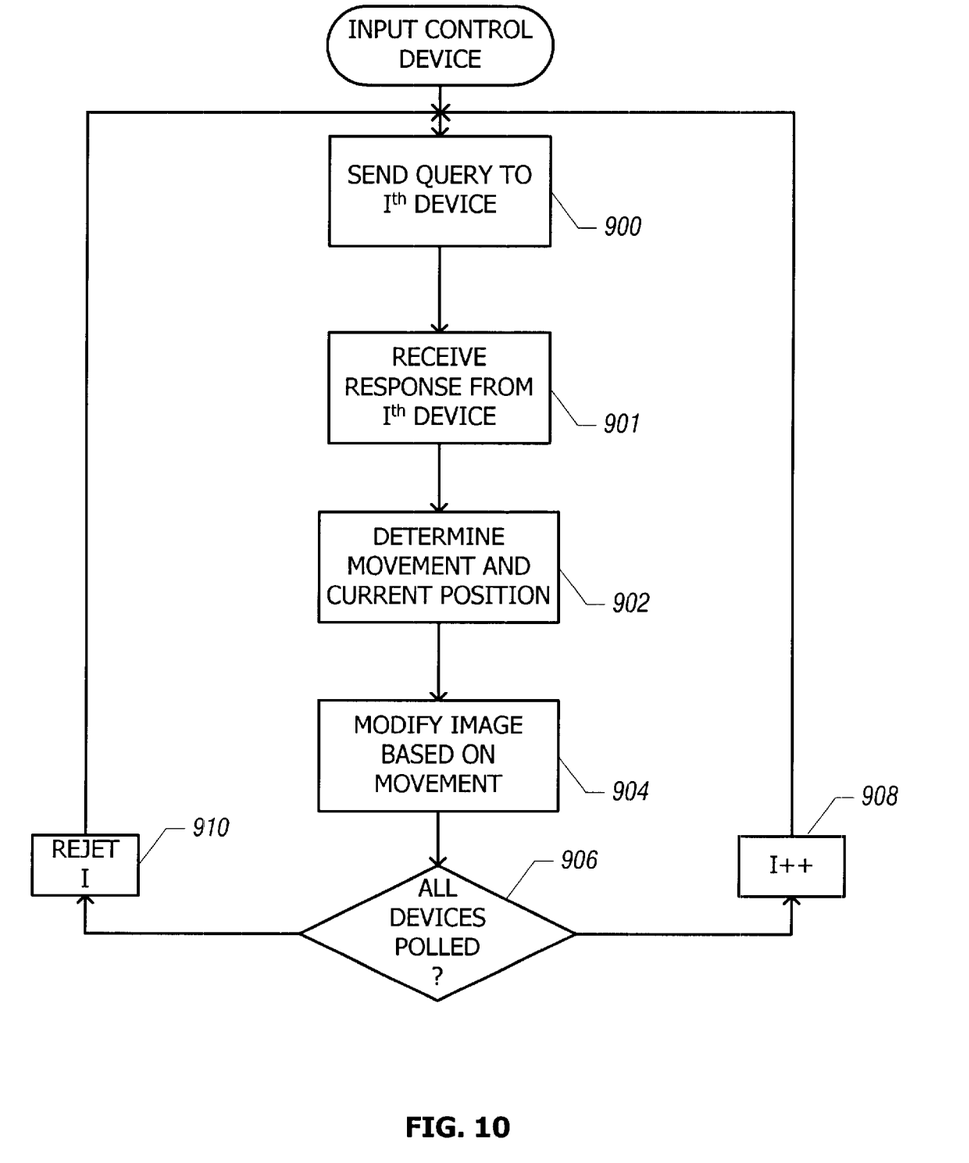
FIG. 10 is a flow diagram of a control program in accordance to an embodiment that is executable in the system of FIG. 1.

Referring to FIG. 10, a flow for the wireless control program 112 stored in the storage device 110 begins by sending (at 900) a query to the $I^{th}$ input device (one of 102A and 102B, for example), where I is initially set to one. The query to the first input device includes a unique ID so that only the first input device responds to the query. In response to the query, the input device having the matching ID transmits predetermined signals to the set-top box 101. The signals received by the set-top box 101 may be wavefronts received by sensors in the receiver 104 of the set-top box so the direction of movement can be determined. In addition, the transmitted signals may include indications of whether one or more buttons on the input device 102 has been depressed. These signals are converted to digital format for processing (at 901) by the processor 106.

Based on the received information, any movement and the current position of the responding input device 102 may be determined (at 902). In addition, indications of buttons being depressed are also processed by the processor 106 under control of the program 112. The images on the display 108 (e.g., an icon, game piece, cursor, etc.) may be adjusted (at 904) based on movement (and any depression of control buttons) of the responding input device. Thus, for example, in a game application, a game piece associated with the moving input device 102 is moved accordingly to reflect the command (which may be movement of the input device or information relating to buttons being depressed on the input device) contained in the input signal.

Next, the program 112 determines if all input devices 102 have been polled (at 906). If not, the variable I is incremented (at 908) to allow the set-top box 101 to poll the next input device. If all input devices have been polled, however, then the variable I is reset (at 910) to repeat the polling process.

The program 112 may know about the existence of the wireless input devices based on configuration information stored in the set-top box 101. In further embodiments, additional wireless input devices may be dynamically added to the system 100. For example, when a new input device is added to the system 100, it may transmit its ID along with other information, such as the device's serial number or other identification information. When the control program 112 detects the new ID and/or other information, the program 112 may add the input device as an active device.

The wireless input device control program 112, along with other software or firmware, may be stored or otherwise tangibly embodied in one or more machine-readable storage media in the sub-system 101, such as the storage device 110 (FIG. 1). Storage media suitable for tangibly embodying software and firmware instructions may include different forms of memory including semiconductor memory devices such as dynamic or static random access memories, erasable and programmable read-only memories (EPROMs), electrically erasable and programmable read-only memories (EEPROMs), and flash memories; magnetic disks such as fixed, floppy and removable disks; other magnetic media including tape; and optical media such as CD or DVD disks. The instructions stored in the storage media when executed cause the sub-system 101 to perform programmed acts.

The software or firmware can be loaded into the sub-system 101 in one of many different ways. For example, instructions or other code segments stored on storage media or transported through a network interface card, modem, or other interface mechanism may be loaded into the sub-system 101 and executed to perform programmed acts. In the loading or transport process, data signals that are embodied as carrier waves (transmitted over telephone lines, network lines, wireless links, cables and the like) may communicate the instructions or code segments to the sub-system 101.

Figure 2:
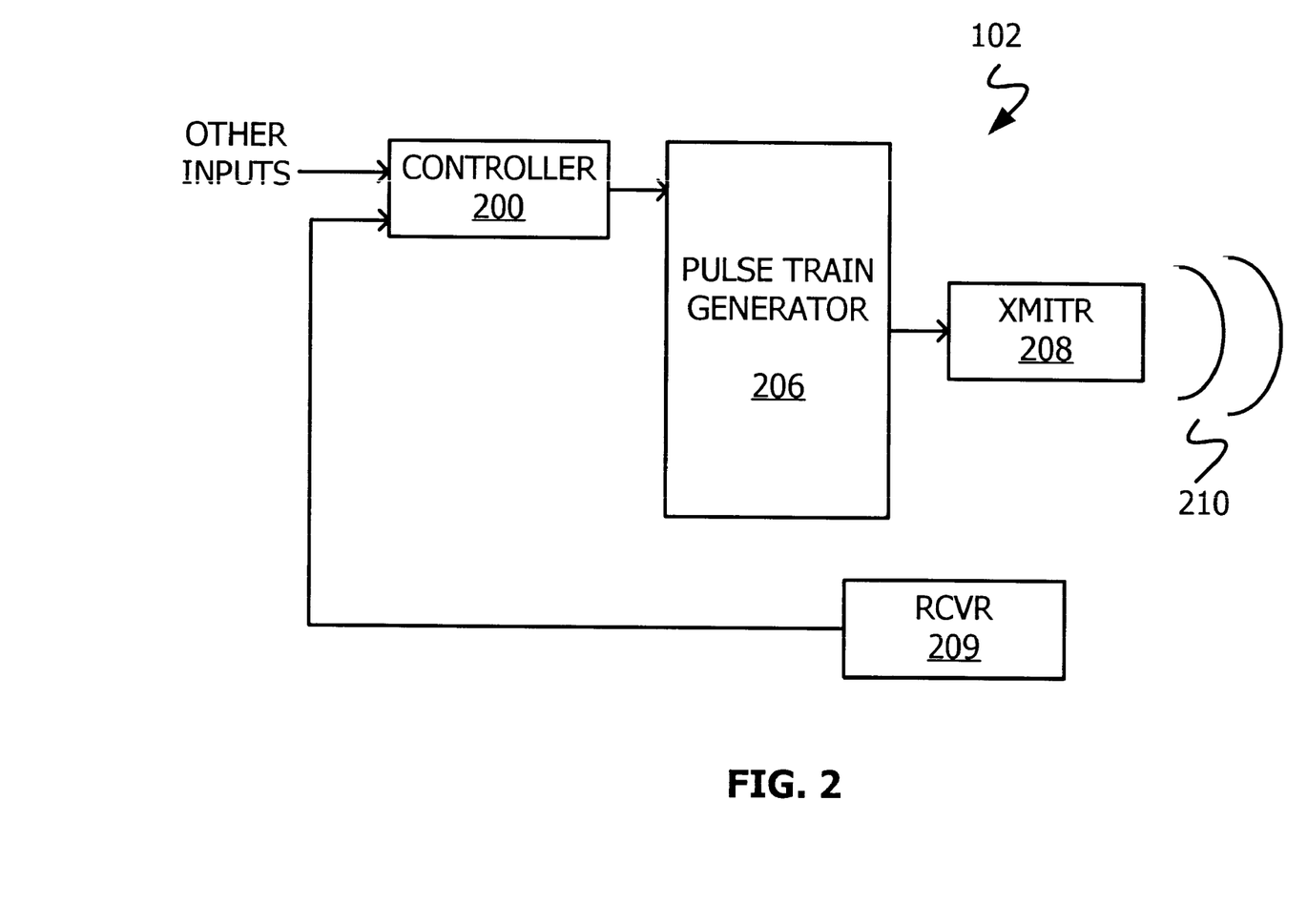
FIG. 2 is a block diagram of a wireless input device in accordance with one embodiment of the invention in the system of FIG. 1.

Referring To FIG. 2, each wireless input device 102 (either 102A or 102B) in accordance with one embodiment may include a transmitter 208 and a receiver 209. In addition, the wireless input device 102 may include a controller 200 that receives inputs, e.g., from buttons, switches or other components. The controller 200 may be a microcontroller, ASIC, PGA, or the like, or it may be implemented with discrete logic devices. The input device 102 also includes a pulse train generator 206. In one embodiment, the controller 200 may be activated in response to signals received by the receiver 209 from the set-top box. If the signals include a query containing the ID of the input device, then the controller 200 is activated. In another embodiment, the controller 200 may be automatically activated to indicate that the wireless input device 102 is being moved, for example, by an internal motion sensor in the wireless input device 102. The wireless input device 102 may be moved horizontally, vertically, or via rotation by a user.

The controller 200 may also be activated in response to, for example, activation of buttons on the input device by a user. In one embodiment, the pulse train generator 206 may generate unique streams of digital pulses (of arbitrary length such as, for example, 10 pulses) to indicate which one, or combination of, inputs to the controller 200 has been activated. For example, activation of the controller 200 due to receipt of a query from the set-top box or by sensed motion of the input device may result in pulse generator 206 generating a first unique pulse train (e.g., <1 1 0 0 1 1 0 1 0 1>). Activation of an input to the controller 200 corresponding to one or more buttons may result in the generation of a second unique pulse train (e.g., <1 0 0 0 0 1 1 1 0 1>). Transmitter 208 may then convert the stream of digital pulses into a signal and transmit that signal in the direction in which the wireless input device 102 is pointed (typically toward the display 108).

The transmitter 208 may employ an infrared emitting diode whose natural transmission profile 210 may be used by a receiver 104 (either 104A or 104B) to determine the wireless input device's direction and speed of motion. If the natural energy profile of the IR transmitter 208 is not acceptable (given, for example, the designed for distance between a wireless input device 102 and receiver 104), it may be shaped into the proper profile (typically Gaussian in the X and Y directions) by a plastic lens (not shown in FIG. 2) in a further embodiment.

In one example embodiment, the receiver 104 in a sub-system 101 may include two detectors or sensors in the X direction and two detectors or sensors in the Y direction. The detectors or sensors may be IR detectors (for example, photodiodes or phototransistors). (By convention X and Y directions are generally perpendicular.) Detectors within a detector pair (X or Y) may be separated by, for example, 7 centimeters, although detector spacing may depend upon a number of factors including the distance between a wireless input device 102 and a receiver 104, the distance between a receiver 104 and the device being controlled such as the display 108, the energy profile of the wireless input device's transmitter (e.g., IR emitting diode), whether a lens is used to modify the transmitter's energy profile, whether the receiver uses a lens to focus the received signals, and the number of detectors or sensors. Output from the X direction detectors and the Y direction detectors may be processed to generate a signal indicative of a wireless input device's motion.

Figure 3:
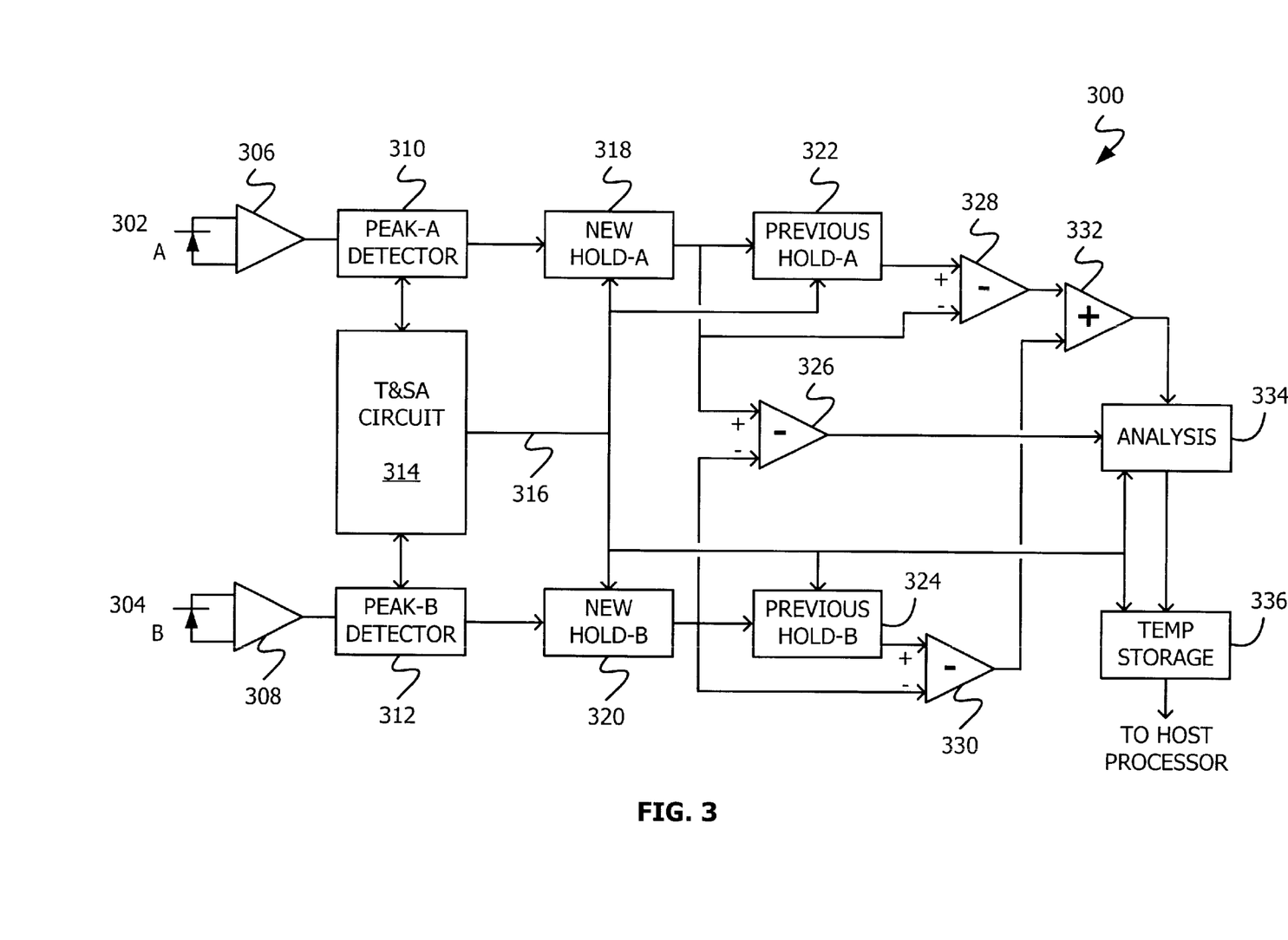
FIG. 3 is a block diagram of a wireless receiver in accordance with one embodiment of the invention in the system of FIG. 1.

Referring to FIG. 3, processing circuitry 300 in the receiver 104 of the sub-system 101 for one detector pair (e.g., an X direction photodiode or phototransistor pair) is shown in accordance with one embodiment. The illustrated embodiment includes two detectors or sensors; it is to be understood, however, that further embodiments may include additional detectors or sensors. Each of the sensors 120, 122, and 124 illustrated in FIG. 9 may include a photodiode and an associated amplifier, illustrated as elements 302, 304, 306, and 308 in FIG. 3 for a pair of detectors.

Photodiode 302 and photodiode 304 detect IR pulse trains (in the X plane) transmitted by wireless input device 102. Amplifier 306 amplifies the signal detected by photodiode 302 and amplifier 308 amplifies the signal detected by photodiode 304. Following amplification, peak detector 310 and peak detector 312 capture the peak value of their respective received IR signals. In one embodiment, peak detectors 310 and 312 capture the peak of the first or last pulse in a received pulse train. In another embodiment, peak detectors 310 and 312 capture the peak value from an entire received pulse train. Regardless of which peak value peak detectors 310 and 312 are designed to capture, peak detectors 310 and 312 may also indicate the sequence of received pulses as a string of 1s and 0s to the timing and signature analysis (T&SA) circuit 314. For example, if the received pulse train represents the binary sequence <1 1 0 0 1 1 0 1 0 1>, peak detectors 310 and 312 may indicate this sequence one pulse/bit at a time to T&SA circuit 314. If peak detector 310 and peak detector 312 indicate a different sequence, this may imply that the wireless input device 102 is out of range to receiver 104.

Figure 4:
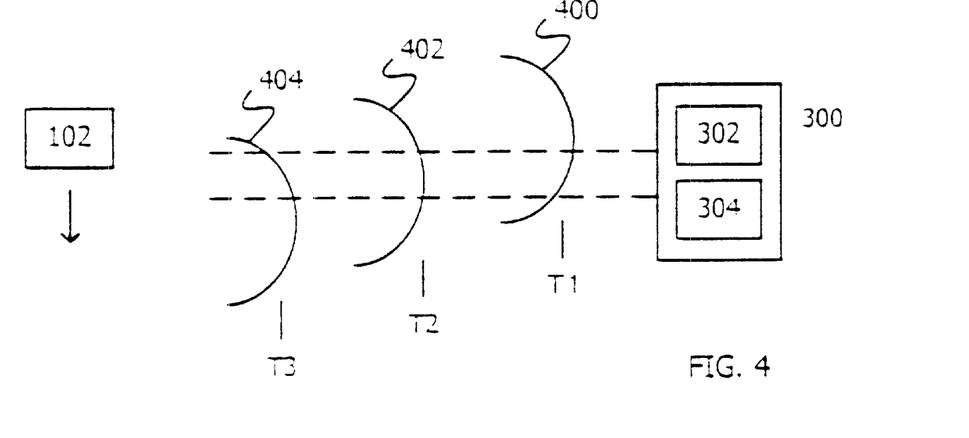
FIG. 4 illustrates a series of pulse trains as received by a pair of diode receivers in accordance with one embodiment of the invention.

A series of pulse train wavefronts and their reception by diodes 302 and 304 is shown in FIG. 4. At time T1 wireless input device 102 may transmit a first pulse train 400, at a later time T2 a second pulse train 402, and at still a later time T3 a third pulse train 404. As shown, detector 302 and detector 304 may receive slightly different representations of the transmitted signals 400, 402, and 404 because of the detectors' physical separation. Wavefronts 400 through 404 may, for example, represent the unique digital pulse train <1 1 0 0 1 1 0 1 0 1> indicating that wireless input device 102 is being moved from left to right.

Referring again to FIG. 3, T&SA circuit 314 evaluates the sequence of bits provided by peak detectors 310 and 312 to determine which wireless input device controller 200 and/or 202 and/or 204, is currently activated and to signal reception of a complete pulse train on one or more control signal output lines 316. That is, T&SA circuit 314 characterizes a received pulse train by determining if the received signals indicate activation of, for example, controller 200, and/or controller 202, and/or controller 204. T&SA circuit 314 may also trigger peak detectors 310 and 312 to capture and hold the peak value of a received pulse, e.g., the third pulse in a received pulse train. In one embodiment of the invention, T&SA circuit 314 first detects controller 200 activation (signaling, for example, wireless input device 102 is in motion) before recognizing any other control activation's such as, for example, a left or right mouse button activation via controller 202 or controller 204. In another embodiment of the invention, T&SA circuit 314 may be a programmable control device such as a microprocessor or a microcontroller. In yet another embodiment of the invention, T&SA circuit 314 may be a custom designed state machine implemented, for example, using discrete logic or specifically designed ASICs or PGAs.

When T&SA circuit 314 determines a complete pulse train has been received, it may command new hold circuit 318 and new hold circuit 320 to record (e.g., latch) the current peak value in peak detectors 310 and 312 respectively. (Circuits 310 and 318 may be the same circuitry, as may circuits 312 and 320.) Prior to this operation T&SA circuit 314 may also command (via control signal output lines 316) previously hold circuit 322 and previous hold circuit 324 to receive and store (e.g., latch) the value stored in new hold circuits 318 and 320 respectively. In this manner, new hold circuits 318 and 320 record a peak value associated with the currently received pulse train, while previous hold circuits 322 and 324 record peak values associated with the preceding received pulse train.

Values stored in new hold circuit 318 and new hold circuit 320 are provided as inputs to difference amplifier 326. In one embodiment, difference amplifier 326's output indicates whether output from new hold circuit 318 is greater than, less than, or equal to output from new hold circuit 320. If output from amplifier 326 is greater than zero, this may indicate that the detectors (e.g., 302 and 304) are detecting energy on the right side of the received pulse (e.g., the "bottom" half of the pulse as shown in FIG. 4). If output from amplifier 326 is less than zero, this may indicate that the detectors are detecting energy on the left side of the received pulse (e.g., the "top" half of the pulse as shown in FIG. 4). If output from amplifier 326 is equal to zero, this may indicate that the detectors are detecting energy from the center of the received pulse.

Difference amplifiers 328 and 330 provide signals representative of the difference between the new (output from circuits 318 and 320) and previous (output from circuits 322 and 324) peak values for each of the signal pathways within processing circuit 300. Output from difference amplifier 326 and summing amplifier 332 are provided as inputs to analysis circuit 334 to determine the direction of wireless input device 102 movement, the amount of that motion, and perhaps the speed of the motion.

Figure 5:
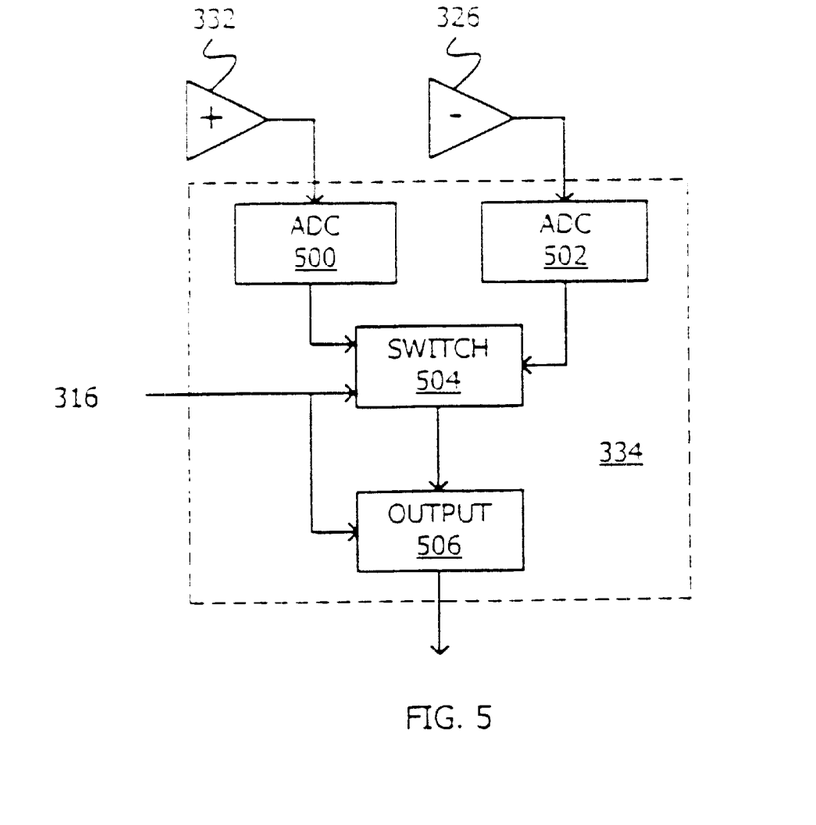
FIG. 5 shows an illustrative analysis circuit in accordance with the embodiment of FIG. 3.

Referring to FIG. 5, in one embodiment of the invention, analysis circuit 334 may include analog-to-digital converter (ADC) 500 and ADC 502, switch 504, and output circuit 506. By convention, ADC 500 and 502 transform the analog output signal from amplifiers 326 and 332 to a digital word (e.g., from 2-bits to 16-bits). Switch 504 selectively routes output from ADC 500 or ADC 502 to output circuit 506, depending upon T&SA circuit 314 control signal output 316. Output circuit 506 may generate a signal indicative of how much the wireless input device has moved, the direction of that movement, whether the user has activated a control (e.g., controller 202 or controller 204), and perhaps the speed of the wireless input device's motion. In one embodiment, output circuit 506 receives input from X direction, Y direction and, if implemented, Z direction processing circuits and, based on this input, generates a data packet (e.g., in conformance with standard mouse data packet formats or other formats) for transmission to the control program 112 executing on the processor 106.

In one embodiment of the invention, output circuit 506 determines wireless input device 102 movement in a direction (e.g., the X direction or the Y direction) by correlating output from amplifiers 326 and 332 in accordance with Table 1. In Table 1, the "+" symbol represents a positive output value, a "−" symbol represents a negative output value, and a "0" symbol represents a null or zero output value. It is noted that zero output does not necessarily mean absolutely zero output, but rather an output within a specified range of zero. The specified range will generally be a function of the characteristic of the relevant signals. For example, if amplifier 332 output may range from −12 volts to +12 volts, then zero may be represented by an output voltage of between approximately −0.1 volts and +0.1 volts.) In another embodiment, analysis circuit 334 may receive input from amplifiers 326 and either 328 and 330. In yet another embodiment, amplifier 332 may be replaced with a circuit that selects output from the amplifier (328 or 330) which is the largest (e.g., most positive).

TABLE 1

Output Circuit Operation

| Output from Amplifier 332 | Output from Amplifier 326 | Determined Direction of Motion |
|---|---|---|
| + | + | Left to Right Motion |
| + | − | Right to Left Motion |
| + | 0 | Left to Right Motion |
| − | + | Right to Left Motion |
| − | − | Right to Left Motion |
| − | 0 | Right to Left Motion |
| 0 | + | No Information |
| 0 | − | No Information |
| 0 | 0 | No Information |

Figure 6A:
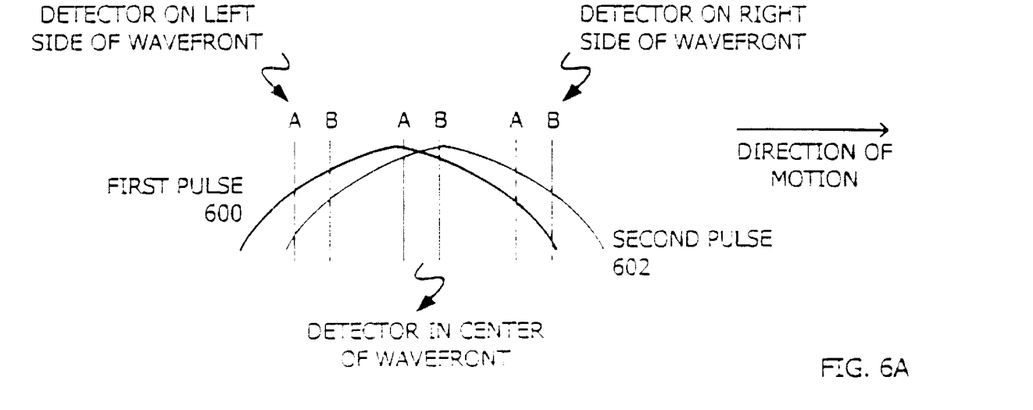
FIGS. 6A and 6B illustrate the difference signals that may be detected depending upon what part of a received signal is received.
Figure 6B:
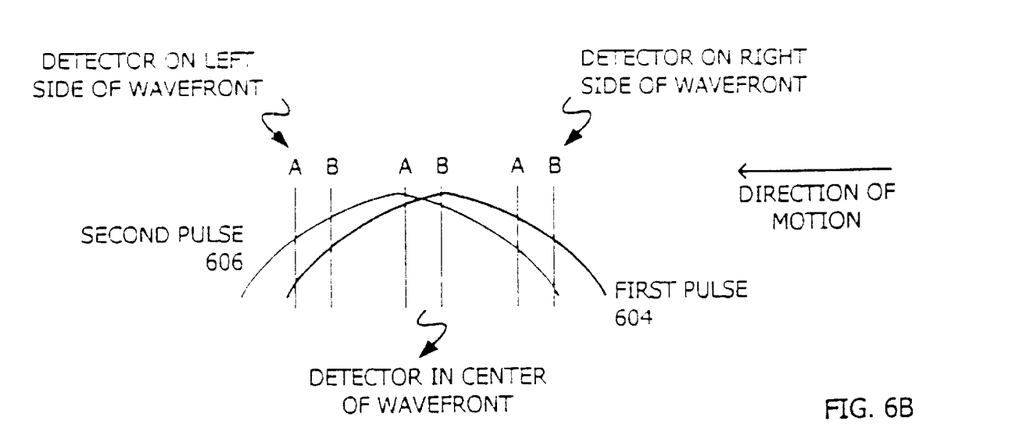

The various situations indicated in Table 1 are shown graphically in FIGS. 6A and 6B. FIG. 6A shows two pulses from pointer device 102 moving from the left to the right—as may be received by detectors 302 and 304 in each of the three possible positions. FIG. 6B shows similar information for a pair of pulses moving from the right to the left. Pulses 600, 602, 604, and 606 represent wavefronts comprising a number of pulses, similar to pulses 400, 402, and 406, for example. For example, controller 200 may be activated by receipt of a query containing a valid ID. In an alternative embodiment, the controller 200 may be automatically activated whenever wireless input device 102 is in motion, causing pulse train generator 206 to periodically (e.g., every 10 milliseconds) generate a unique pulse train which may then be transmitted by transmitter 208 to generate a wavefront (e.g., 600, 602, 604, or 606).

If movement in accordance with Table 1 is detected in the X direction, for example, a uniform displacement/movement in the X direction may be assumed. As repeated indications of movement in the X direction are received, the wireless input device may systematically move, for example, an image across a display. The same process may be used to track wireless input device 102 movement in the Y and Z directions. Alternatively, movement in the Z direction may be determined by the amplitude of the signal transmitted by the input device 102. It is further noted that amplifier 326 output represents the tangent of the detected wavefront's energy profile, while amplifier 332 output represents a change in position of the wireless input device. Thus, by calibrating the energy profile of the transmitter and using output from amplifiers 326 and 332, the pointer device's speed of motion (as well as the input device's direction) may be calculated.

Figure 7:
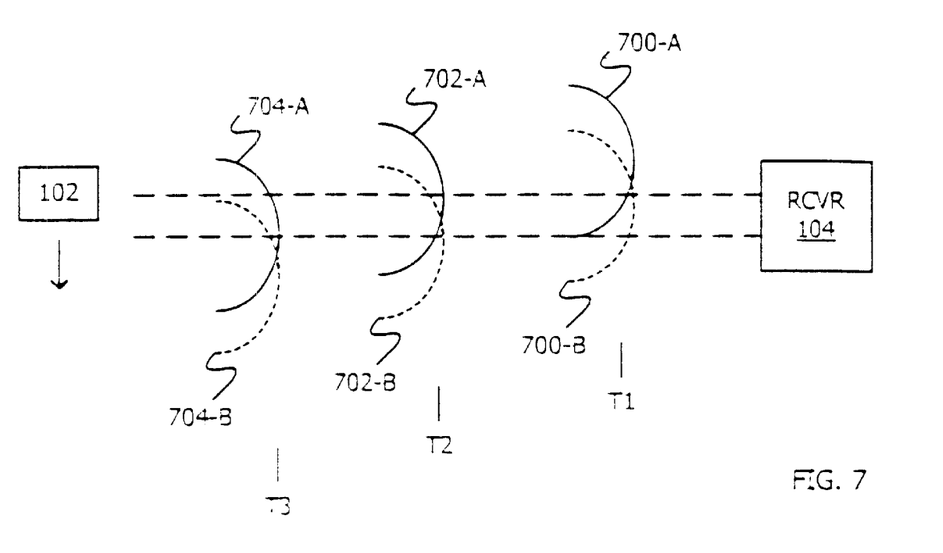
FIG. 7 illustrates another series of pulse trains in accordance with an embodiment of the invention using a two diode wireless input device.

If the transmitted pulse train wavefronts (e.g., 600) are too broadly or too narrowly focused, slight motions of wireless input device 102 may go undetected. For example, if the transmitted wavefronts are too broadly focused, small horizontal, vertical, and rotational movements of wireless input device 102 may not be detectable at receiver 104 because the detectors (e.g., 302 and 304) may not be able to detect a difference between two substantially planar waves. For example, if transmitter 208 generates broad wavefronts and detectors are located at the center of the received waveform (see FIGS. 6A and 6B), small movements of pointer device 102 may not be detectable (see Table 1). On the other hand, if the transmitted wavefronts are too narrowly focused, receiver 104 (e.g., detectors 302 and 304) may not receive sufficient signal to detect. This latter case may be made more significant if wireless input device 102 is not pointed toward receiver 104. By adding an additional transmitting device, such as another IR emitting diode, to wireless input device 102 (at an X and Y angle slightly different from that of the original transmitting diode), these problems may be overcome. Two transmitting devices aligned as described above may generate slightly different pulse train wavefronts as shown in FIG. 7. For example, wavefronts such as 700-A and 702-A may be generated by one diode, and wavefronts such as 700-B and 702-B by another diode. Under these conditions processing circuitry may detect slight motions by independently processing the different pulse train signals.

Figure 8:
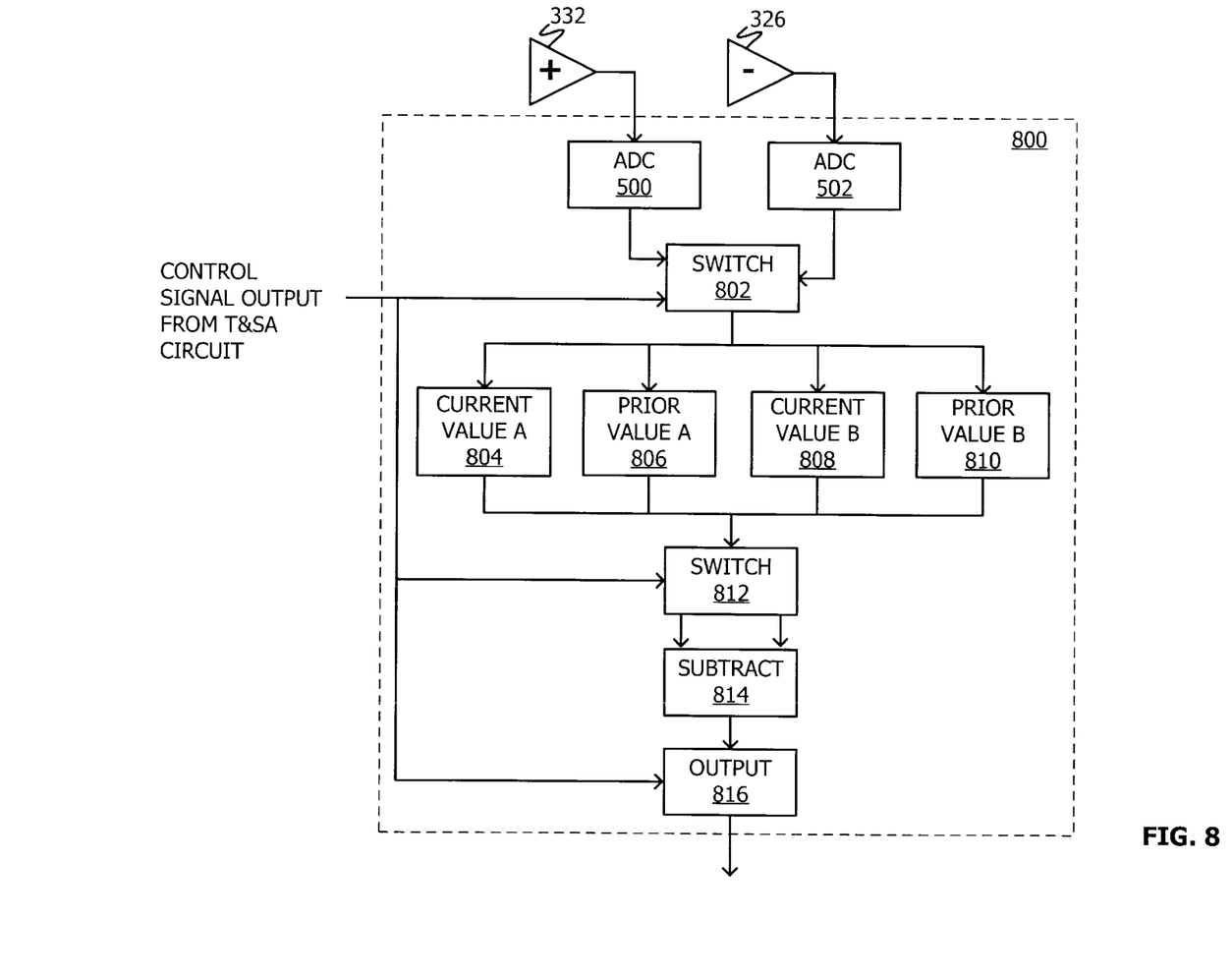
FIG. 8 shows an illustrative analysis circuit in accordance with another embodiment of the invention.

In an embodiment of the invention utilizing two wireless input device transmitting elements, T&SA circuit may be modified to detect and indicate which of the transmitting devices generated the received signal. Referring to FIG. 8, analysis circuit 800 in accordance with this embodiment of the invention may digitize amplifier 326 and 332 output as shown in FIG. 5. Switch 802 may selectively route ADC 500 and 502 output to one of four registers: current value register 804; prior value register 806; current value register 808; and prior value register 810. Registers 804 and 806 are used when control signal output from the T&SA circuit indicates output from amplifiers 326 and 332 is associated with a current received signal and registers 808 and 810 are used when processing output from amplifiers 326 and 332 associated with a prior received signal. Switch 812 selectively routes output from either A registers 804 and 806 or B registers 808 and 810 to subtraction circuit 814. Control signal output from T&SA circuit determines which of the registers are so routed. Output circuit 816 may generate wireless input device data packets for transmission to a host processor (e.g., wireless input device driver) as described above (e.g., wireless input device driver) as described above (e.g., Table 1).

A two diode wireless input device in accordance with the above description may also be used to track three dimensional (3D) motion. For example, wireless input device motion in the X and Y directions would be processed as described above. Motion in the Z direction (i.e., perpendicular to the X and Y directions) may be represented by rotating the wireless input device. In this embodiment, receiver 104 may include three processors—one for each of the X, Y and Z directions, or alternatively, sensors are arranged only in the X and Y directions and Z motion is determined by the signal amplitude from the input devices.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A method of communicating with wireless input devices, comprising:
   receiving wireless signals from the input devices;
   determining motion of the wireless input devices based on, in part, detecting by a matrix of detectors, the wireless signals; and
   updating a display based on the determined motion of the wireless input devices.

2. The method of claim 1, further comprising issuing queries to the plurality of wireless input devices one at a time to sequentially obtain responses from the wireless input devices.

3. The system of claim 2, wherein each query includes an identifier of one of the wireless input devices.

4. The method of claim 1, wherein updating the display comprises controlling movement of displayed graphical elements based on the determined motion of the wireless input devices.

5. The method of claim 4, wherein controlling movement of the graphical elements comprises controlling movement of each graphical element with a corresponding wireless input device.

6. The method of claim 1, wherein determining motion of the wireless input devices comprises determining motion of the wireless input devices in at least two dimensions.

7. The method of claim 6, wherein determining motion of the wireless input devices comprises determining the motion using a tracking circuit using the matrix of detectors having a two-dimensional matrix of detectors.

8. The method of claim 7, wherein determining motion of the wireless input devices comprises determining motion of the wireless input device further in a third dimension.

9. The method of claim 8, wherein determining motion in the third dimension comprises using the tracking circuit to measure intensity of each of the wireless signals from the wireless input devices.

10. A system comprising:
    a plurality of wireless input devices;
    a receiver coupled to a matrix of detectors to receive a plurality of wireless signals from the wireless input devices; and
    a processor adapted to generate queries to the wireless input devices in a time-multiplexed manner to obtain responses from the wireless input devices one at a time.

11. An article including a machine-readable storage medium containing instructions for causing a system to track wireless input devices, the instructions when executed causing the system to:
    receive, using a matrix of detectors, a plurality of wireless signals from the wireless input devices;
    determine motion of the wireless input devices based on the wireless signals; and
    update a display based on the determined motion of the wireless input devices.

12. The article of claim 11, wherein the storage medium contains instructions for further causing the system to issue queries to the plurality of wireless input devices one at a time to sequentially obtain responses from the wireless input devices.

13. A system, comprising:
    a bus;
    a host processor operatively coupled to the bus; and
    a first wireless unit operatively coupled to the bus, the first wireless unit including a receiver utilizing a matrix of detectors to receive a plurality of wireless signals from a plurality of wireless input devices, and an analysis circuit, operatively coupled to the receiver to determine movement of the wireless input devices.

14. The system of claim 13 further comprising a second wireless unit operatively coupled to the bus.

15. The system of claim 13 wherein the signals are radio-frequency signals.

16. The system of claim 13, the analysis circuit further to detect selection of a button on one of the wireless input devices.

17. A system comprising:
    a plurality of wireless input device;
    a receiver utilizing a matrix of detectors coupled to receive a plurality of wireless signal from the plurality of wireless input devices; and
    a tracking circuit adapted to determine movement of the wireless input devices in at least two dimensions based on the received wireless signal.

18. The system of claim 17, wherein the matrix of detectors includes first detectors to detect movement of the wireless input devices in a first dimension and second sensors to detect movement of the wireless input devices in a second dimension.

19. The system of claim 17, wherein the tracking circuit is adapted to determine movement of the wireless input devices in a third dimension.

20. The system of claim 19, further comprising a display containing graphical representations that are adjusted based on movement of the wireless input devices.

21. The system of claim 20, wherein the graphical representations are rendered in three-dimensional space.

22. A system capable of communicating with a plurality of wireless input devices, comprising:
    a receiver utilizing a matrix of detectors to receive wireless signals from the wireless input devices;
    a tracking circuit to detect movements of the wireless input devices; and
    a display to display graphical elements movable in response to detected movements of the wireless input devices.

23. The system of claim 22, further comprising a processor to generate queries to poll the wireless input devices.

24. The system of claim 23, wherein each query includes an identifier of one of the wireless input devices.

25. The system of claim 22, wherein the receiver includes an infrared receiver.

26. The system of claim 22, wherein the receiver detects motion of the wireless input devices in at least two directions.

27. The system of claim 26, wherein the matrix includes a row of detectors to detect movement of the wireless input devices in a generally horizontal direction and a column of detectors to detect movement of the wireless input devices in a generally vertical direction.

28. The system of claim 26, wherein the receiver detects amplitudes of signals from the wireless input devices to determine distances of the wireless input devices from the system.

29. The tracking system of claim 22, wherein the graphical elements comprise electronic game pieces.

30. The tracking system of claim 22, wherein each of the graphical elements is movable in response to detected movement of a corresponding wireless input device.

31. The tracking system of claim 30, wherein each graphical element corresponds to a different wireless input device.

32. A system comprising:
a plurality of wireless input devices;
a tracking circuit, utilizing a matrix of detectors, to detect changing distance of each of the wireless input devices based on wireless signals received from the wireless input devices.

33. The system of claim 32, the tracking circuit further to detect motion in at least two other dimensions.

34. The system of claim 33, wherein the matrix of detectors comprises a two-dimensional matrix of sensors to detect motion in the at least two other dimensions.

35. The system of claim 34, the tracking circuit to measure an energy level of a wireless signal from each wireless input device to determine a distance to the wireless input device.

36. The system of claim 32, the tracking circuit to measure an energy level of a wireless signal from each wireless input device to determine a distance to the wireless input device.

* * * * *